United States Patent [19]

Rys-Sikora

[11] 4,391,923
[45] Jul. 5, 1983

[54] LOW DENSITY CLOSED-CELL FOAMED ARTICLES FROM ETHYLENE COPOLYMER/VINYL OR VINYLIDENE HALIDE BLENDS

[75] Inventor: John Rys-Sikora, Bel Aire, Md.

[73] Assignee: E. I. Du Pont de Nemours & Co., Wilmington, Del.

[21] Appl. No.: 424,449

[22] Filed: Sep. 27, 1982

[51] Int. Cl.$^3$ .......................... C08J 9/06; C08L 81/00
[52] U.S. Cl. ......................................... 521/96; 521/95; 521/134; 521/189; 525/189; 525/190
[58] Field of Search ................ 525/189, 190; 521/134, 521/96, 95, 189

[56] References Cited

U.S. PATENT DOCUMENTS

| 2,387,730 | 10/1945 | Alderson, Jr. | 521/143 |
| 2,849,028 | 8/1958 | Clark et al. | 521/139 |
| 3,341,481 | 9/1967 | Palmer | 521/143 |
| 3,553,348 | 1/1971 | Betts | 174/110 SR |
| 3,657,202 | 4/1972 | Hammer | 525/189 |
| 3,684,778 | 8/1972 | Hammer | 525/189 |
| 3,780,140 | 12/1973 | Hammer | 525/190 |
| 3,855,160 | 12/1974 | Shiotsu et al. | 521/70 |
| 4,157,428 | 6/1979 | Hammer | 525/189 |
| 4,172,939 | 10/1979 | Hoh | 525/189 |
| 4,275,181 | 6/1981 | Hoh | 525/189 |

FOREIGN PATENT DOCUMENTS

| 229568 | 8/1958 | Australia . |
| 2148496 | 8/1972 | France . |
| 1459666 | 12/1976 | United Kingdom . |
| 2014153 | 8/1979 | United Kingdom . |

Primary Examiner—Morton Foelak

[57] ABSTRACT

The subject invention is a foamable composition based on a blend of a carbon monoxide- or sulfur dioxide-containing ethylene copolymer and a vinyl or vinylidene halide polymer, and the closed-cell foamed article produced therefrom.

13 Claims, No Drawings

LOW DENSITY CLOSED-CELL FOAMED ARTICLES FROM ETHYLENE COPOLYMER/VINYL OR VINYLIDENE HALIDE BLENDS

BACKGROUND

The subject invention is a foamable composition based on a blend of a carbon monoxide- or sulfur dioxide-containing ethylene copolymer and a vinyl or vinylidene halide polymer, and the closed-cell foamed article produced therefrom.

European patent application No. 19910 discloses that low density closed-cell foamed articles can be produced from blends of 65–95 weight percent ethylene/vinyl acetate copolymer and 5–35 weight percent vinyl chloride polymer. In order to form a satisfactory foamed article, it is taught therein that the mold must be cooled before opening the mold and releasing the foamed article. Further, the foamed articles produced from these blends are deficient in dimensional and heat stability.

SUMMARY OF THE INVENTION

In one embodiment, the subject invention is a foamable composition comprising (a) 5 to 95 weight percent based on the blend of a copolymer of (i) ethylene; (ii) 1 to 60 weight percent based on copolymer of a softening monomer selected from the group consisting of unsaturated mono- or dicarboxylic acids of 3–20 carbon atoms, esters of said unsaturated mono- or dicarboxylic acids, vinyl esters of saturated carboxylic acids where the acid group has 2–18 carbon atoms, vinyl alkyl ethers wherein the alkyl group has 1–18 carbon atoms, vinyl or vinylidene halides, acrylonitrile, methacrylonitrile, norbornene, alpha olefins of 3–12 carbon atoms and vinyl aromatic compounds; and (iii) 1 to 30 weight percent based on copolymer of a member of the group consisting of carbon monoxide or sulfur dioxide; (b) 5 to 95 weight percent of a vinyl or vinylidene halide polymer; and (c) 0.5 to 20 weight percent based on the blend of a chemical blowing agent.

In another embodiment, the subject invention is a closed-cell foamed article comprising a crosslinked blend of (a) 5 to 95 weight percent based on the blend of a copolymer of (i) ethylene; (ii) 1 to 60 weight percent based on copolymer of a softening monomer selected from the group consisting of unsaturated mono- or dicarboxylic acids of 3–20 carbon atoms, esters of said unsaturated mono- or dicarboxylic acids, vinyl esters of saturated carboxylic acids where the acid group has 2–18 carbon atoms, vinyl alkyl ethers wherein the alkyl group has 1–18 carbon atoms, vinyl or vinylidene halides, acrylonitrile, methacrylonitrile, norbornene, alpha olefins of 3–12 carbon atoms and vinyl aromatic compounds; and (iii) 1 to 30 weight percent based on copolymer of a member of the group consisting of carbon monoxide or sulfur dioxide; and (b) 5 to 95 weight percent of a vinyl or vinylidene halide polymer.

DETAILED DESCRIPTION

The ethylene copolymers useful in the practice of the subject invention include those copolymers having the formula E/X/Y, where X is an ethylenically unsaturated organic monomer and Y is either carbon monoxide or sulfur dioxide. Exemplary of the organic monomers are those selected from the group consisting of unsaturated mono- or dicarboxylic acids of 3–20 carbon atoms, esters of said unsaturated mono- or dicarboxylic acids, vinyl esters of saturated carboxylic acids where the acid group has 2–18 carbon atoms, vinyl alkyl ethers wherein the alkyl group has 1–18 carbon atoms, vinyl or vinylidene halides, acrylonitrile, methacrylonitrile, norbornene, alpha olefins of 3–12 carbon atoms, and vinyl aromatic compounds. Preferred organic monomers include methyl acrylate, butyl acrylate and vinyl acetate. Of course, more than one of these organic monomers may be copolymerized with ethylene and carbon monoxide sulfur dioxide to form the ethylene copolymer useful in the practice of the subject invention. The melt index range for these copolymers is 0.1 to 1000 (ASTM D-1238), preferably 1 to 100.

The ethylene copolymers useful in the practice of the subject invention preferably have sufficient comonomer copolymerized therein to exhibit compatability with the vinyl and vinylidene halide polymers described below. This compatibility is evidenced by optical transparency of a blend of the ethylene copolymer and the vinyl or vinylidene halide polymer. Generally speaking, these ethylene copolymers represented by the formula E/X/Y exhibit compatibility with vinyl and vinylidene halide polymers when the ethylene content in these terpolymers is about 40 to 85 percent, the organic monomer content 1 to 60 percent, and the carbon monoxide or sulfur dioxide content 1 to 30 percent, all based on polymer weight. When an ethylene copolymer is used which is not compatible with the vinyl or vinylidene polymers, the foamed composition produced therefrom have relatively low tensile and tear strengths. A more detailed discussion of the compatability of these ethylene copolymers with vinyl and vinylidene halide polymers, as well as a discussion of the preparation of the copolymers can be found in *Polymer-Polymer Miscibility*, O. Olabisi, L. M. Robes on and M. T. Shaw, Academic Press, New York, N.Y., 1979, U.S. Pat. No. 3,684,778 and U.S. Pat. No. 3,780,140, all herein incorporated by reference.

The ethylene copolymers described above are blended in accordance with the subject invention with 5 to 95 weight percent (based on composition weight of ethylene copolymer and halide polymer) of vinyl or vinylidene halide polymers including copolymers resulting from copolymerization with a comonomer selected from the group consisting of vinyl esters, acrylonitrile, acrylic esters, vinylidene chloride, vinyl chloride, esters of unsaturated carboxylic acids and vinyl ethers. For example, polyvinyl chloride having an inherent viscosity of 0.30 to 1.4 (ASTM D-1243) is generally useful in the practice of the subject invention. It will be apparent to those skilled in the art that in order to blend these vinyl or vinylidene halide polymers with the above detailed ethylene copolymers, it is necessary that the halide polymers be stabilized using any of the well known stabilizing systems. For example, polyvinyl chloride is commonly stabilized using Ba, Cd and/or Zn complexes, as well as certain phosphites and chlorine acceptors such as lead oxide. Therefore, all reference herein to vinyl or vinylidene halide polymers is meant to include only stabilized halide polymers. The compositions of the subject invention are particularly useful when the vinyl or vinylidene halide polymers are present in at least 50 weight percent due to their superior rigidity and tensile and tear strengths.

The blending of the ethylene copolymer with the vinyl or vinylidene halide polymer is accomplished by any one of a number of conventional techniques, for example, in a Banbury mixer, two-roll mill or extruder. This blending is done at a temperature high enough to soften the polymers for adequate blending, but not so high as to degrade the vinyl or vinylidene halide polymer. Generally speaking this blending temperature ranges from 140° to 200° C., and blending is carried out for a time sufficient to homogeneously blend the components.

Crosslinking of the compatible blends of the subject invention is carried out using any one or more of the well known crosslinking techniques including electron beam irradiation, gamma irradiation and free radical crosslinking agents such as peroxides and azides. Examples of suitable peroxides include organic aromatic or aliphatic peroxides, for example aromatic diacyl peroxides and aliphatic diacyl peroxides, peroxides of dibasic acids, ketone peroxides, alkyl peroxy esters, alkyl hydroperoxides, such as diacetyl peroxide, dibenzoyl peroxide, bis-2,4-dichlorobenzoyl peroxide, di-tert-butyl peroxide, dicumyl peroxide, tert-butyl perbenzoate, tert-butyl cumyl peroxide, 2,5-bis(tert-butyl-peroxy)-2,5-dimethyl cyclohexane, 1,3-bis-(tert-butyl-peroxyisopropyl)-benzene, lauryl peroxide, succinic acid peroxide, cyclohexanoate peroxide, tert-butyl peroctoate and tert-butyl hydroperoxide. Generally speaking, these chemical crosslinking agents are added to the foamable compositions of the subject invention in amounts of about 0.2 to 5.0 weight percent based on composition.

Foaming the compositions of the subject invention is carried out using any conventional chemical foaming agent that releases or is converted to a gas during the processing operation. An exemplary list of these foaming agents includes azodicarbonamide (1,1-azobisformamide), sulfonyl hydrazides such as p,p'-oxy-bis-(benzene sulfonyl hydrazide), sulfonyl semicarbazides such as p-toluene sulfonyl semicarbazide, trihydrazine triazine, 5-phenyltetrazole, mono- and polyazo formamide and dinitrosomethyleneamine. These chemical foaming agents are added to the compositions of the subject invention in amounts of about 0.5 to 20 weight percent based on composition.

Although not essential components of the composition of this invention, various amounts of any number of conventional fillers or compounding ingredients may be admixed. Examples of such ingredients include various carbon blacks, clays, silica, alumina, calcium carbonate, titanium dioxide, antioxidants, antidegradants, tackifiers, processing aids such as lubricants and waxes, fire retardants such as hydrated aluminum oxides, petroleum extenders, anti-fungicides, chemical blowing accelerators such as zinc oxide, surface treated urea or pentaerythritol, and plasticizers such as dialkylphthalates, trialkylmellitates and polyester oligomers. The amounts used depend, at least in part, upon the quantities of other ingredients in the composition and the properties desired from the composition. Also, minor amounts of other saturated and unsaturated polymers such as alpha-olefin polymers and methacrylate polymers may be added to reduce the cost or modify the properties of the composition.

In the foaming process, the composition is first intimately mixed in the molten state in a conventional mixer such as a Banbury mixer, two roll mill or a combination of the two, or an extruder. It is essential that the mixing temperature be kept below the decomposition temperature of the foaming agent and, where applicable, the free radical crosslinking agent, generally about 120° C.

After mixing, the composition is placed in a hot compression mold and the platen pressure thereon raised to a pressure sufficient to contain the product in the mold, generally about 23 MPa. The molds used are bevelled outward toward the top of the mold so that the foamed article rises easily out of the mold. Upon pressurization, the foaming agent decomposes to produce small gaseous bubbles throughout the composition. A preferred chemical foaming agent is an azodicarbonamide foaming agent which has a decomposition temperature of 200°–215° C. alone or 130°–155° C. in the presence of a zinc oxide catalyst.

During the heating in the mold, chemical crosslinking agents decompose to produce free radicals which effect crosslinking of the polymer. A preferred chemical crosslinking agent for the purposes of the subject invention is one which displays negligible decomposition at processing temperatures, i.e., less than 120° C., while decomposing at molding temperatures, i.e., above about 150° C. Of course, if irradiation is to be used to crosslink the compositions of the subject invention, those foamable compositions may not contain a chemical crosslinking agent.

The minimum time required for adequate curing of the composition is determined by subjective trial and error methods. That is, when the mold is opened and the foamed article removed, undercure is evidenced by a splitting of the foam resulting from the foam's inability to retain the gases formed by decomposition of the foaming agent. A sufficiently cured foamed article is one which will withstand this internal gas pressure without rupture of its individual closed cells when released from the mold, generally having a density of at least 0.02 g/cm$^3$. If a very rigid foamed article is desired, of course, the cure time can be increased accordingly. When using the foamable compositions of the subject invention, the mold need not be cooled prior to opening the mold and releasing the foamed article.

Upon molding terpolymer compositions of the subject invention containing more than about 5 percent carbon monoxide or sulfur dioxide, various degrees of surface cracking may be evidenced. To alleviate this cracking, a small quantity of chemical crosslinking agent may be added to the composition at the start of the mixing operation, the remainder of the chemical crosslinking agent added at the end of the mixing operation, a trifunctional cocuring agent such as triallyl cyanurate can be added to the composition or mixed chemical crosslinking agents can be used, e.g., 75% conventional peroxide and 25% a more active peroxide.

The closed-cell foamed article made from the compositions of the subject invention have a density of at least 0.02 g/cm$^3$ and a Shore A Hardness of at least about 5.

The advantages of the foamable composition of the subject invention will become more apparent with reference to the examples that follow.

EXAMPLE 1

Unless otherwise specified, the percentages given in all examples herein are on a weight percent basis. The intrinsic viscosities (iv) given for the polyvinyl chloride (PVC) are measured in solutions of 0.2 g of the polymer in 100 ml of cyclohexanone at 25° C. The melt indexes (MI) of the ethylene copolymers are measured at 190° C. according to ASTM D-1238.

This example illustrates the foaming and curing of compositions of the subject invention utilizing a peroxide curing system. Foamed articles are produced of varying hardness and low density. The polymer blend used in this example had the following formulation:

| Polymer blend A | Wt. % |
|---|---|
| PVC (iv = 0.96) | 60.0 |
| E/25% VA/10% CO (MI = 20) | 26.0 |
| "Mark " 517, liquid phosphite chelator* available from Argus Chemical Co. | 0.3 |
| "Mark WS", Ba/Cd laurate* available from Rohm and Haas Co. | 1.0 |
| "Acryloid" K-120N* acrylic fusion aid available from Rohm and Haas Co. | 1.0 |
| Allied Chemical Co. G7A* polyethylene | 1.0 |
| "Paraplex" G-62, epoxy soy oil* available from Rohm and Haas Co. | 3.0 |
| Stearic acid* | .03 |
| Dioctylphthalate plasticizer | 8.0 |

*component of conventional PVC stabilizer system

A blend of the above listed materials was made in two steps. First, all ingredients except E/VA/CO were combined in a high speed dry blender (Wellex). This dry blend was then added to a Banbury internal mixer, along with the E/VA/CO, and was mixed at high speed for 10–15 minutes at a temperature of 190° C. This material is referred to herein as polymer blend A.

Compositions a and b of this example (Table 1) were blended on a two-roll rubber mill operating at 90° C. The "Celogen" AZ-130 and "Vul-Cup" 40KE were added last, after other ingredients were well blended.

The compositions were foamed and cured by loading a 45° bevelled mold (2×2×⅜"), pressurizing the mold to about 40,000 bbs or until the upper and lower half of the mold sealed, heating the mold to 165° C. and releasing the composition from the mold after about 6 minutes. The formulation, curing times and temperatures, and foam properties are given in Table 1.

TABLE 1

| Formulation | Wt. % |
|---|---|
| Polymer Blend A | 52.3 |
| calcium carbonate (Atomite whiting available from Thompson & Weinman Co.) | 26.2 |
| carbon black N-774 available from Continental Carbon Co. | 5.2 |
| "Satintone" Special Clay (available from Engelhard Minerals & Chemicals) | 5.2 |
| zinc oxide | 2.1 |
| stearic acid | .5 |
| pentaerythritol (PER-200 available from Hercules) | 1.5 |
| Azodicarbonamide "Celogen" AZ 130 (available from Uniroyal) | 5.2 |
| "Vul-Cup" 40KE 1,1-bis(t-butylperoxy) diisopropyl benzene (available from Hercules) | 1.7 |
| Composition a | |
| Press cured 4.5 mins. at 165° C. then oven post cured 10 mins. at 160° C. | |
| Density[1] | 0.96 g/cc |
| Shore A hardness[2] | 23 |
| Composition b | |
| Press cured 15 mins. at 140° C. then oven post cured 20 mins. at 160° C. | |
| Density[1] | .11 g/cc |
| Shore A hardness[2] | 15 |

[1]ASTM D-297.
[2]ASTM D-2240.

EXAMPLE 2

This example also illustrates the use of a peroxide curing system in a formulation that results in a low density foam from compositions of the subject invention.

The following composition was blended in a Reifenhauser single screw extruder at 400° C. at about 60 RPM):

| Component | Weight % |
|---|---|
| PVC (Firestone 9300) | 21.4 |
| E/23% VA/10% CO(MI = 20) | 32.7 |
| Ground whiting (available from York) | 5.3 |
| "Hisil" 215 (a silica filler available from PPG Industries) | 11.9 |
| Ba/Cd/Zn complex stabilizer | 0.7 |
| Zn complex stabilizer | 0.1 |
| Stearic Acid | 0.8 |
| "Primol" 205 parafinic oil (available from Enjoy Chemical) | 0.1 |
| ZnO | 0.8 |
| Azodicarbonamide blowing agent "Celogen" AZ-130 | 1.6 |
| Dicumyl peroxide ("Dicup" available from Hercules) | 1.3 |

The blended composition was then calendered to thickness, loaded in a mold and cured (pressure and 165° C.) for about 8 minutes: The foamed articles produced thereby had a density of 0.24 g/cm³.

EXAMPLE 3

The following formulation was blended as per Example 1:

| Formulation | Wt. % |
|---|---|
| PVC (Conoco 5425) | 48 |
| "Mark" 7119 | 2 |
| E/23% VA/10% CO | 50 |
| "Celogen" AZ-130 | 4* |
| "Vul-Cup" 40KE | 5* |

*Based on weight of first three components

The composition was foamed and cured as per Example 1 and had a density of 0.56 g/cc.

What is claimed is:

1. A crosslinkable foamable composition comprising
   (a) 5 to 95 weight percent based on polymer weight of a copolymer of
      (i) ethylene;
      (ii) 1 to 60 weight percent based on copolymer of a softening monomer selected from the group consisting of unsaturated mono- or dicarboxylic acids of 3–20 carbon atoms, esters of said unsaturated mono- or dicarboxylic acids, vinyl esters of saturated carboxylic acids where the acid group has 2–18 carbon atoms, vinyl alkyl ethers wherein the alkyl group has 1–18 carbon atoms, vinyl or vinylidene halides, acrylonitrile, methacrylonitrile, norbornene, alpha olefins of 3–12 carbon atoms and vinyl aromatic compounds; and
      (iii) 1 to 30 weight percent based on copolymer of a member of the group consisting of carbon monoxide or sulfur dioxide;
   (b) 5 to 95 weight percent based on polymer weight of a vinyl or vinylidene halide polymer; and
   (c) 0.5 to 20 weight percent based on the blend of a chemical blowing agent
   (d) from 0.2 to 5.0 percent based on the blend of a free-radical crosslinking agent.

2. The composition of claim 1 wherein (a) and (b) are compatible as evidenced by optical transparency.

3. The composition of claim 2 further containing 0.2 to 5.0 percent based on the blend of a free radical crosslinking agent.

4. The composition of claim 3 wherein the free radical crosslinking agent is a peroxide crosslinking agent.

5. The composition of claim 3 wherein the free radical crosslinking agent is a peroxide crosslinking agent.

6. The composition of claim 1, 2, 3, 4 or 5 wherein (a)(iii) is carbon monoxide.

7. The composition of claim 1, 2, 3, 4 or 5 wherein (a)(iii) is sulfur dioxide.

8. The composition of claim 6 wherein (a)(ii) is selected from the group consisting of methyl acrylate, butyl acrylate, vinyl acetate and maleic acid monoethyl ether.

9. The composition of claim 7 wherein (a)(ii) is selected from the group consisting of methyl acrylate, butyl acrylate, vinyl acetate and maleic acid monoethyl ether.

10. The composition of claim 8 or 9 wherein the weight percent of the vinyl or vinylidene halide polymer is at least 50.

11. The composition of claim 8 or 9 wherein the weight percent of the vinyl or vinylidene halide polymer is up to 50.

12. The composition of claim 10 wherein the vinyl or vinylidene halide polymer is polyvinyl chloride.

13. The composition of claim 11 wherein the vinyl or vinylidene halide polymer is polyvinyl chloride.

* * * * *

UNITED STATES PATENT OFFICE
CERTIFICATE OF CORRECTION

PATENT NO. : 4,391,923
DATED : July 5, 1983
INVENTOR(S) : John Rys-Sikora

It is certified that error appears in the above–identified patent and that said Letters Patent are hereby corrected as shown below:

The title should be changed to "FOAMABLE COMPOSITIONS OF ETHYLENE COPOLYMER/VINYL OR VINYLIDENE HALIDE BLENDS".

On the title page, Assignee should be --Bata Limited and E. I. du Pont de Nemours and Company--.

Column 6, line 66, --and-- should be inserted after "agent".

Column 7, line 6, claim 4, "3" should be --1--.

Column 8, line 2, "ether" should be --ester--.

Column 8, line 6, "ether" should be --ester--.

Signed and Sealed this

Tenth Day of January 1984

[SEAL]

Attest:

GERALD J. MOSSINGHOFF

Attesting Officer    Commissioner of Patents and Trademarks